US012171726B2

(12) United States Patent
Liss et al.

(10) Patent No.: US 12,171,726 B2
(45) Date of Patent: Dec. 24, 2024

(54) APPARATUS FOR FEEDING AN INFANT IN A VERTICAL POSITION

(71) Applicant: SLS INNOVATIONS LLC, Sparta, NJ (US)

(72) Inventors: Steve Liss, Sparta, NJ (US); Sabina Liss, Sparta, NJ (US)

(73) Assignee: SLS INNOVATIONS LLC, NJ (US)

( * ) Notice: Subject to any disclaimer, the term of this patent is extended or adjusted under 35 U.S.C. 154(b) by 109 days.

(21) Appl. No.: 17/978,540

(22) Filed: Nov. 1, 2022

(65) Prior Publication Data

US 2023/0133051 A1 May 4, 2023

Related U.S. Application Data

(60) Provisional application No. 63/274,104, filed on Nov. 1, 2021.

(51) Int. Cl.
*A61J 9/06* (2006.01)

(52) U.S. Cl.
CPC ........... *A61J 9/0638* (2015.05); *A61J 9/0676* (2015.05); *A61J 9/0692* (2015.05)

(58) Field of Classification Search
CPC ...... A61J 9/0638; A61J 9/0676; A61J 9/0692; A45F 2200/0583
USPC ............................................. 224/201, 148.4
See application file for complete search history.

(56) References Cited

U.S. PATENT DOCUMENTS

| | | | | | |
|---|---|---|---|---|---|
| 2,631,288 | A * | 3/1953 | Daust | A61J 9/0684 | 2/49.3 |
| 2,907,539 | A * | 10/1959 | Vardan | A61J 9/0676 | 248/104 |
| 3,016,221 | A * | 1/1962 | Underwood | A61J 9/0676 | 248/102 |
| 3,197,099 | A * | 7/1965 | Doba | A61J 9/0638 | 224/613 |
| 4,957,253 | A * | 9/1990 | Roy | A61J 9/0676 | 248/104 |
| 5,135,189 | A * | 8/1992 | Ghazizadeh | F16M 13/022 | 248/104 |
| 6,398,088 | B1 * | 6/2002 | Burke | A61J 9/0638 | D3/214 |
| 2003/0218105 | A1 * | 11/2003 | Sones | A61J 9/0692 | 248/104 |

* cited by examiner

*Primary Examiner* — Adam J Waggenspack
(74) *Attorney, Agent, or Firm* — Gearhart Law, LLC

(57) ABSTRACT

An apparatus for feeding an infant in a vertical position is described. The apparatus includes a shoulder support component and a flexible component. The shoulder support component generally has a U-shape with a first side disposed opposite a second side. The second side of the shoulder support component is configured to contact shoulders of a caregiver. The flexible component has a first end disposed opposite a second end. The first end of the flexible component is affixed to the first side of the shoulder support component and the second end includes a bottle holding portion that supports a bottle for feeding an infant in a vertical position.

14 Claims, 7 Drawing Sheets

APPARATUS FOR FEEDING AN INFANT IN A VERTICAL POSITION

The present invention claims priority under 35 USC 119(e) to U.S. Provisional Patent No. 63/274,104 filed Nov. 1, 2021, the entire contents of which are incorporated herein by reference in its entirety.

FIELD OF THE INVENTION

The field of the invention and its embodiments relate to devices for supporting a bottle for a baby or an infant during feeding. More specifically, the field of the invention and its embodiments relate to devices for supporting a bottle for feeding an infant in a vertical position.

BACKGROUND OF THE INVENTION

Feeding an infant or a young baby using a bottle can be a physically demanding task. First, an infant must be fed several times during the day, often resulting in sleep deprivation for the caregiver. Additionally, most infants must be physically held in the arms of the caregiver during the feeding process and the caregiver must position and hold the bottle containing the baby's milk. As such, feeding an infant is time consuming. Furthermore, when infants or young babies are fed in a horizontal position, the formula from the bottle can flow into the baby's ear, causing an infection. Alternatively, if the infant or baby is properly fed in the horizontal position, this feeding may result in reflux. One possible means of avoiding these issues is for the caregiver to figure out a way to hold the infant or young baby in an upright and vertical position during feeding. Most caregivers have at most two arms so that if the caregiver requires both arms to make the infant or baby vertical, holding a bottle and positioning it in a manner that the baby or infant can be fed becomes quite difficult.

US20130126563A1 describes a baby bottle holding apparatus and a method of use thereof which allow the wearer to conveniently bottle-feed a baby in closeness and comfort similarly found in breastfeeding.

U.S. Pat. No. 7,316,035B2 describes a multi-purpose burp cloth that allows parents or caregivers to perform other activities while feeding his or her baby by bottle that also acts as a baby diaper changing pad and pacifier holder. The burp cloth has a front side and a back side that are attached to one another by stitching. A pillow is located at an upper portion of the burp cloth and a clip is located just below the pillow on the front component, while a strap is attached to the front side. To use the cloth, the user simply wraps the strap around the bottle and attaches the fastening means on a strap outer surface to a fastening means located on a strap inner surface.

U.S. Pat. No. 7,048,160B2 describes an infant feeding and entertainment support comprising a front panel and a rear panel detachably affixed thereto with the front panel alternatively adapted to include bottle feeding holder means.

U.S. Pat. No. 6,000,664A describes a baby bottle support bib intended to be worn by an individual while bottle feeding a baby. A baby bottle is removably attached to the bib so as to be held in the preferred orientation for feeding the baby. The orientation of the baby is shown to be in a horizontal position.

GB9710153A describes a baby bottle holder that may be biased against a person holding the baby, or rested upon the baby, for stability with at least one hand of the person being free to do other things, and by the baby with or without hands.

U.S. Pat. No. 5,582,335A describes a nursing baby bottle holder for supporting a baby bottle in a nursing position. The baby bottle has a body portion and a neck portion. The holder comprises a length of material defining an annular open end to releasably secure the body portion of the baby bottle. The length is sufficient to drape the material around a neck of a user while supporting the baby bottle in a nursing position.

U.S. Pat. No. 5,573,153A describes a feed cloth and bottle combination that includes a cloth sized to be draped over a user's shoulder. An area of the cloth includes a first of a hook and loop fastener. A strap is secured to a baby bottle with an exterior surface of the strap having a second of a hook and loop fastener such that the strap and the bottle can be secured to the cloth with the bottle held in any desired orientation.

CA2146700A1 describes an apparatus for detachably holding a baby bottle to a bib. The apparatus comprises a hook and loop fastener portion mounted to a baby bottle which integrates with a complementary fastener portion disposed on a bib. The bottle is disposed on the bib at a desired orientation to reach the baby's mouth. The apparatus is worn by the caregiver while holding and feeding the baby.

U.S. Pat. No. 4,537,341A describes a nursing bottle holder characterized by an elongated, flexible strip of material which is draped around the neck of an infant's attendant. A pair of elastic straps are attached to one end of the strip and are provided with cooperating attachment members which allow them to be formed into a loops adapted to hold a nursing bottle. A counterweight is attached to the other end of the strap to prevent the weight of the bottle from pulling the flexible strip from around the attendant's neck. The position of the counterweight can be changed so as to adjust the height and position of the nursing bottle.

U.S. Pat. No. 4,220,302A describes a nursing bottle holder comprising a shoulder strap having a Velcro pad disposed on the front vertical surface thereof and a bottle strap having a complimentary Velcro pad disposed on the outer surface thereof, the Velcro pads being temporarily engageable to hold the nursing bottle in a selected vertically planar position. The shoulder strap and bottle strap may also each be provided with Velcro strips on opposing ends and surfaces thereof, respectively for adjusting the shoulder strap about the body and the bottle strap about bottles of varying diameters.

GB2021957A describes a nursing bottle holder for location around a person's neck whereby a baby cradled in one arm of the person can be comfortably fed from a bottle positioned in the holder, leaving the other arm of the person free. The bottle holder includes a halter member and support means mounted on one end of the halter member for gripping therein the bottle. The support means are freely rotatable on the halter member in a substantially horizontal plane to permit the bottle to follow any side-to-side movements of the baby's head. The support means is also pivotable in a generally vertical plane against an adjustable frictional resistance whereby the bottle can be retained as desired in a retracted, inoperative position to enable winding and the like of the baby.

U.S. Pat. No. 3,850,393A describes a versatile clamp or support is disclosed for alternate use with a neck strap or a stand which facilitates the proper positioning of a baby bottle during the feeding of a baby. With the clamp or support suspended from the neck strap the bottle can be positioned in a number of feeding attitudes for the baby, cradled in the user's lap or in one or both arms. In another embodiment the clamp or support can be used with the stand which rests upon a planar surface, such as the baby's bed, providing means whereby the bottle can be moved into a number of still different positions in relation to the baby for proper unattended feeding.

JP2013103118A describes a nursing bottle holder, U.S. Pat. No. 2,907,539A describes a shoulder baby bottle holder, U.S. Pat. No. 2,907,539A describes a shoulder baby bottle holder, U.S. Pat. No. 2,893,672A describes a nursing bottle holder, and USD0782055S protects the ornamental design associated with a baby bottle holder for feeding a baby.

The instant invention addresses and remedies the above mentioned problems and cures the defects that are present in the prior art. The instant invention greatly reduces the physical effort required to feed an infant. For example, in an embodiment, the instant invention holds the bottle in a vertical or near vertical position, allowing the caregiver to effortlessly feed the infant in a vertical or near vertical position.

Various systems exist in the art. However, their means of operation are substantially different from the present disclosure, as the other inventions fail to solve all the problems taught by the present disclosure.

SUMMARY OF THE INVENTION

The present invention and its embodiments relate to devices for supporting a bottle for a baby or an infant during feeding. More specifically, the present invention and its embodiments relate to devices for supporting a bottle for feeding an infant in a vertical position.

An embodiment of the present invention describes an apparatus for feeding an infant in a vertical position. In general, the apparatus includes a shoulder support component and a flexible component. The shoulder support component has a first side disposed opposite a second side. The second side of the shoulder support component contacts shoulders of a caregiver during use of the apparatus.

The shoulder support component has a U-shape such that a neck of the caregiver is received in the bend of the U-shape. It should be appreciated that the shoulder support component comprises one or more materials, such as: a plastic material, a foam material, or a cloth material, among others not explicitly listed herein. In additional examples, the second side of the shoulder support component may include one or more portions of padding.

The flexible component of the apparatus has a first end disposed opposite a second end. The flexible component may comprise a bendable material that retains a shape. It should be appreciated that the bendable material is not limited to any particular material. The first end of the flexible component is affixed to the first side of the shoulder support component and the second end includes a bottle holding portion that supports a bottle for feeding an infant in a vertical position. In an embodiment, the first end of the flexible component may be affixed at a position that is at the back of the shoulder support component (i.e., so that when worn it is behind the caregiver's neck).

DETAILED DESCRIPTION OF THE INVENTION

Figure 1:
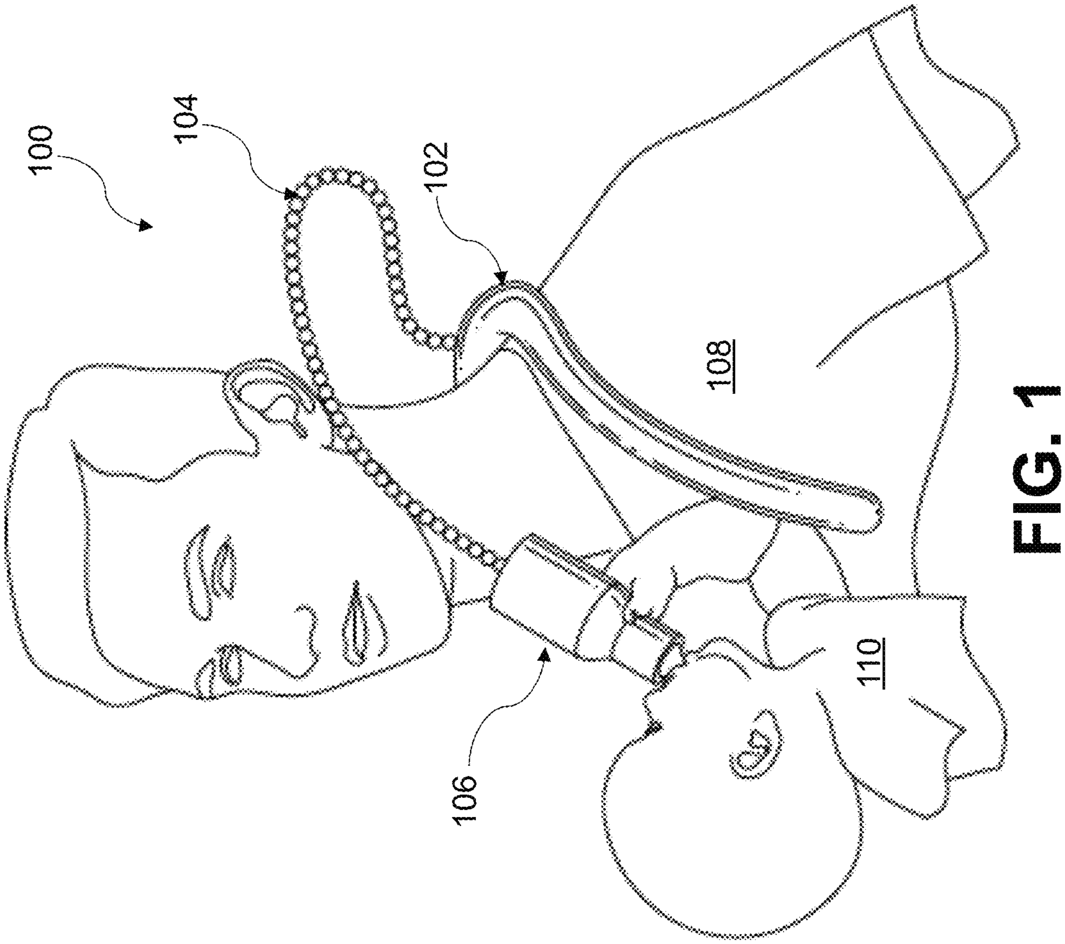
FIG. 1 depicts a schematic diagram of an apparatus for feeding an infant in a vertical position, in accordance with embodiments of the present invention.

In an embodiment, the present invention relates to an apparatus and methods of using the apparatus to feed an infant in a vertical position.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As explained herein, feeding an infant or a young baby using a bottle can be a physically demanding task. First, an infant must be fed several times during the day, often resulting in sleep deprivation for the caregiver. Additionally, most infants must be physically held in the arms of the caregiver during the feeding process and the caregiver must also position and hold the bottle containing the baby's milk. As such, feeding an infant is time consuming. Furthermore, when infants or young babies are fed in a horizontal position, the formula from the bottle can flow into the baby's ear, causing an ear infection. Alternatively, if the baby or infant is fed in a horizontal position, the feeding can result in reflux, which is highly uncomfortable for a baby or infant. Moreover, if the baby or infant is fed in a horizontal position, the baby or infant may swallow more gas than if fed in the vertical position, which is also quite uncomfortable for the baby. To avoid these issues, the caregiver must figure out a way to hold the infant or young baby in an upright and vertical position during feeding.

The instant invention addresses and remedies these concerns. The instant invention greatly reduces the physical effort required to feed an infant. For example, the instant invention holds the bottle in a vertical or near vertical position, allowing the caregiver to effortlessly feed the infant in a vertical or near vertical position. An apparatus that frees up the hands of the caregiver and lets the baby be fed in a vertical position is disclosed herein.

Figure 2:
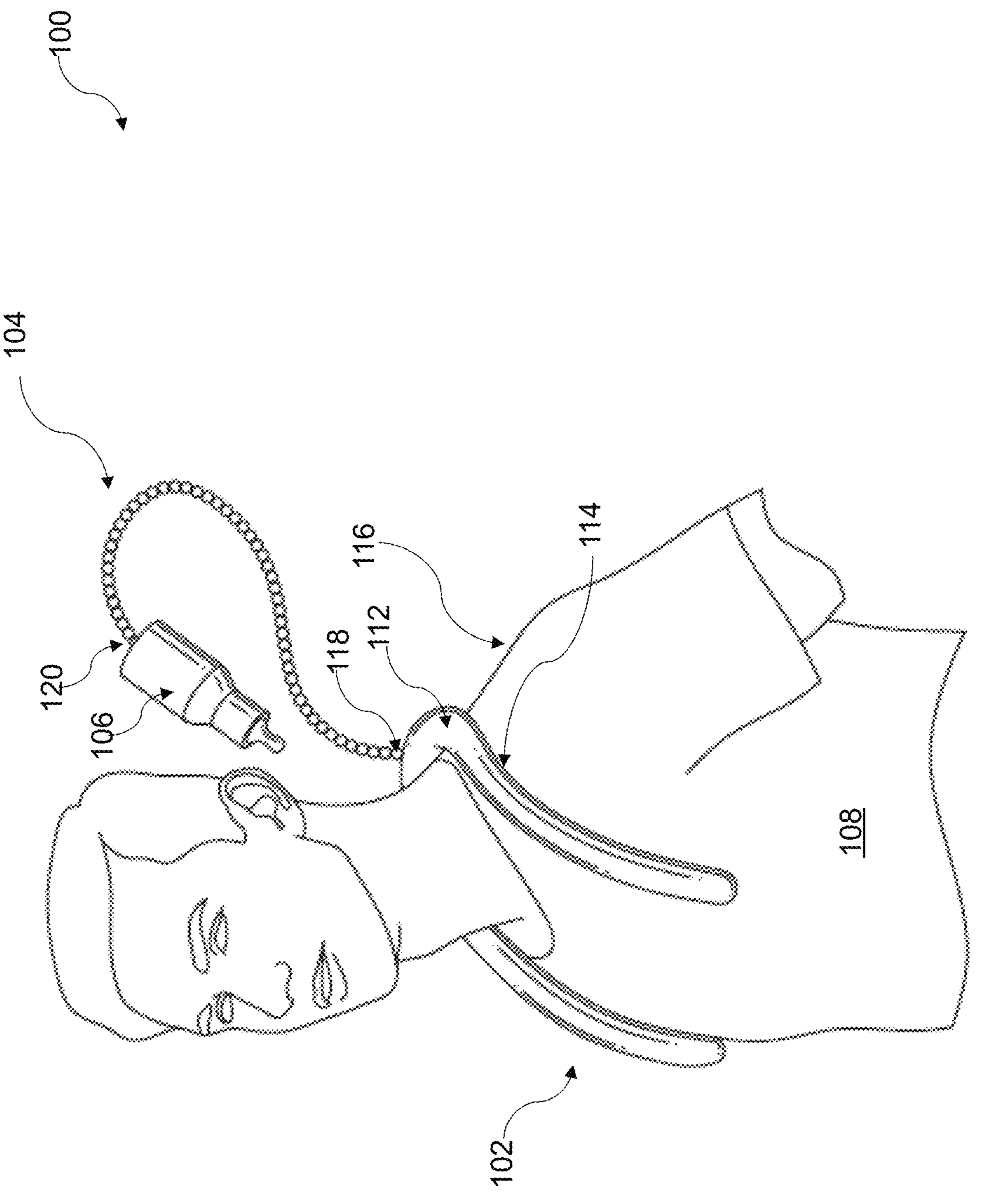
FIG. 2 depicts another schematic diagram of an apparatus for feeding an infant in a vertical position, in accordance with embodiments of the present invention.

An apparatus 100 for feeding an infant in a vertical position is described and depicted herein in FIG. 1 and FIG. 2. In general, the apparatus 100 includes a shoulder support component 102 and a flexible component 104. The shoulder support component 102 has a first side 112 disposed opposite a second side 114. The second side 114 of the shoulder support component 102 contacts shoulders 116 of a caregiver 108 (e.g., parent, babysitter, nanny, nurse, etc.) during use of the apparatus 100.

As depicted in FIG. 1 and FIG. 2, the shoulder support component 102 has a U-shape such that a neck of the caregiver 108 is received in the bend of the U-shape. It should be appreciated that the shoulder support component 102 comprises one or more materials, such as: a rubber material, a plastic material, a foam material, a polymeric material, or a cloth material, among others not explicitly listed herein. In additional examples, the second side 114 of the shoulder support component 102 may include one or more portions of padding. In an example, an entirety of the second side 114 of the shoulder support component 102 comprises padding for comfort during use of the apparatus 100. The padding for comfort can be any material that provides comfort to the caregiver. For example, the padding may be a foam type padding, a soft rubber or soft plastic padding, cloth, and or combinations thereof. Examples of foam padding that can be used in the present invention include polyester, polyether, polystyrene, polyurethane, polyethylene, vinyl, EVA (ethylene vinyl acetate copolymer) foam, and combinations thereof.

Figure 3:
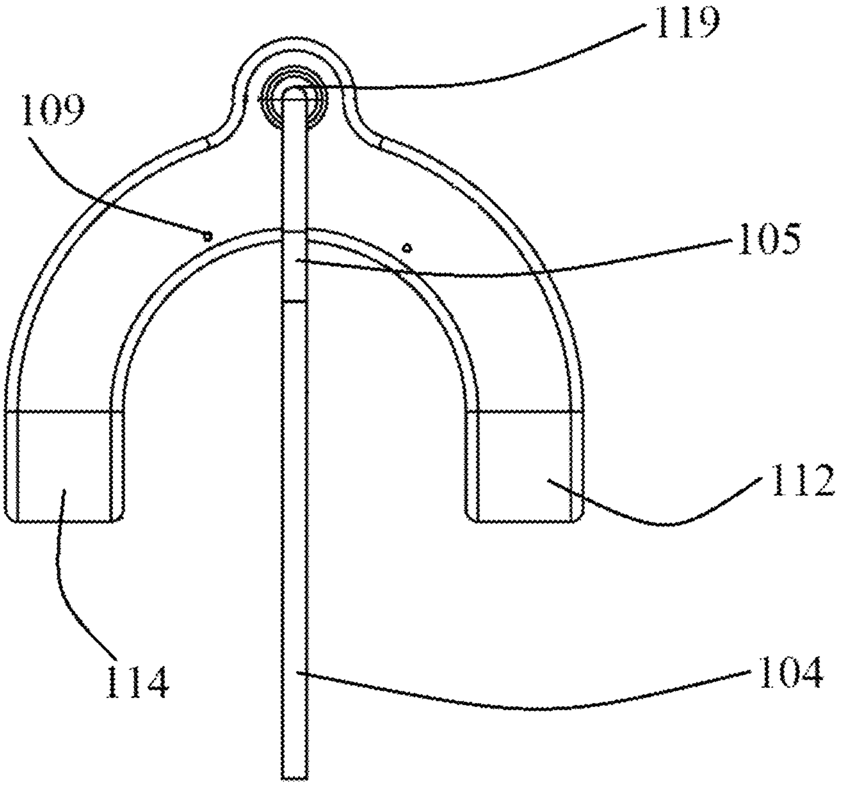
FIG. 3 shows a top down figure of the shoulder support component and the flexible component of the apparatus of the present invention.
Figure 4:
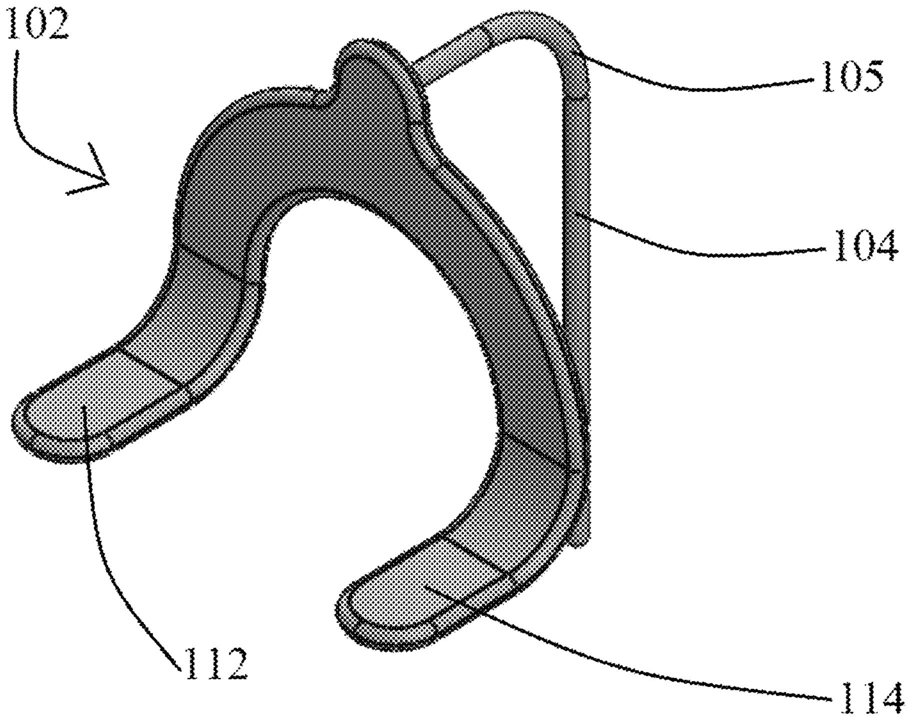
FIG. 4 shows a perspective view of the shoulder support component and the flexible component of the apparatus of the present invention.
Figure 5:
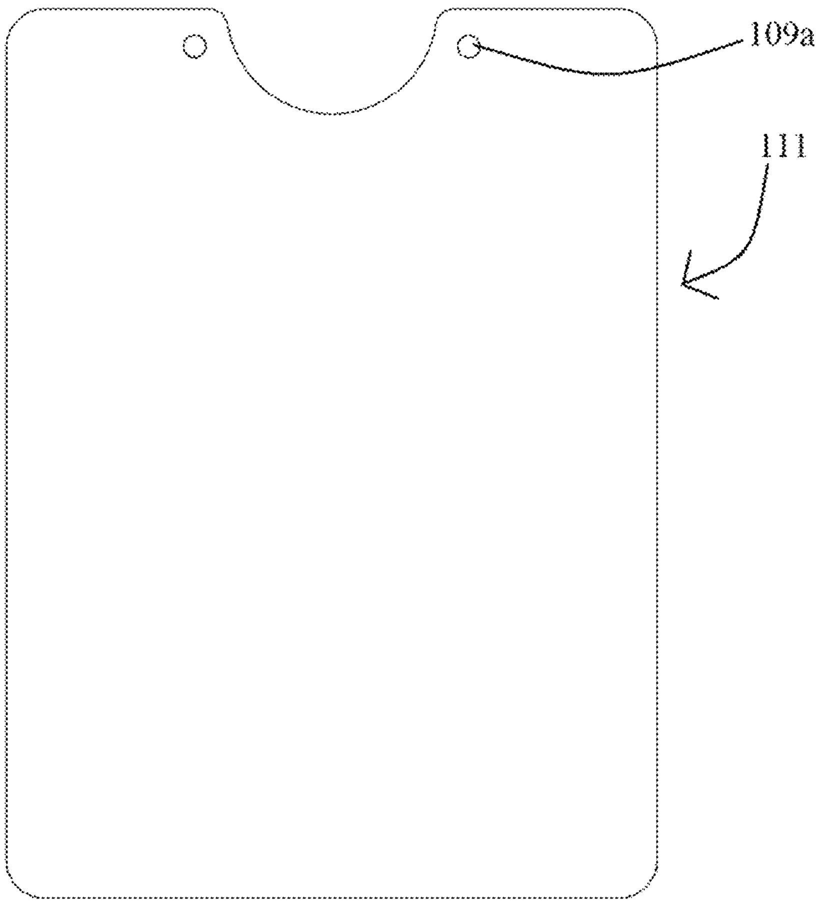
FIG. 5 shows a front view of the bib, which can be snapped onto the should support component.

In an embodiment, the shoulder support component 102 may comprise snap fasteners 109 at a position on the shoulder support component 102 that is roughly where the shoulder support component 102 sits on the shoulders of the caregiver 108 so that a bib 111 can be snapped in place. The bib 111 will have the correspondingly positioned accommodating snap fastener part 109*a* to allow the bib to be snapped into the snap fasteners 109 on the shoulder support component 102 (see FIGS. 3 and 5). For example if the snap fasteners 109 on the shoulder support component 102 comprise the sockets of a snap, the bib comprises appropriately positioned studs that allow the bib to snap onto the shoulder support component 102. Alternatively, the snap fasteners 109 of the shoulder support component 102 may comprise studs and the bib comprises appropriately positioned sockets. As is typical of snap fasteners, there may also be caps and posts associated with the appropriate snap fastener parts for aesthetic and functional purposes.

Moreover, the flexible component 104 of the apparatus 100 has a first end 118 disposed opposite a second end 120. The flexible component 104 may comprise a bendable material that retains a shape. The bendable material is not limited to any particular material or materials. Examples of some bendable materials that can retain their shape include metallic compounds, thermoformed plastics, various bendable rubbers, polyester or nylon pile, certain copolymers that contain polypropylene, copper wire, or other bendable wire that may or may not have a polymeric coating. In an embodiment, a plurality of metallic wires can be used that are parallel to each other that allows the flexible component 104 to be bent to a desired shape and allows the flexible component 104 to retain its bent shape. In an embodiment, the metallic wires may be substantially parallel to each other but they may have a twist so that each of the wire wrap around the other wires (e.g., have a helical relationship to each other). The plurality of wires may have a flexible polymeric plastic coating (sheathing) that not only makes the flexible component 104 more aesthetically pleasing but also allows for easy cleaning. In an embodiment, the flexible component 104 may also comprise a series of segmented sections 105 with ball joints present at the ends of the segmented sections that allows for the flexible component 104 to be bent and retain its shape. The smaller the segments are, the greater the bendability of the flexible component 104. Furthermore, in examples, a material of the shoulder support component 102 and/or the flexible component 104 may comprise a water-resistant material (such as the polymeric sheathing) for cleaning purposes. The flexible component 104 may also have a sheath made of cloth that covers the flexible component 104. In one embodiment, the cloth may be a scrunchy cloth material that has some flexibility that will allow the scrunchy cloth material to be removed easily for cleaning, and then easily once again put around the flexible component after it has been cleaned.

Figure 6:
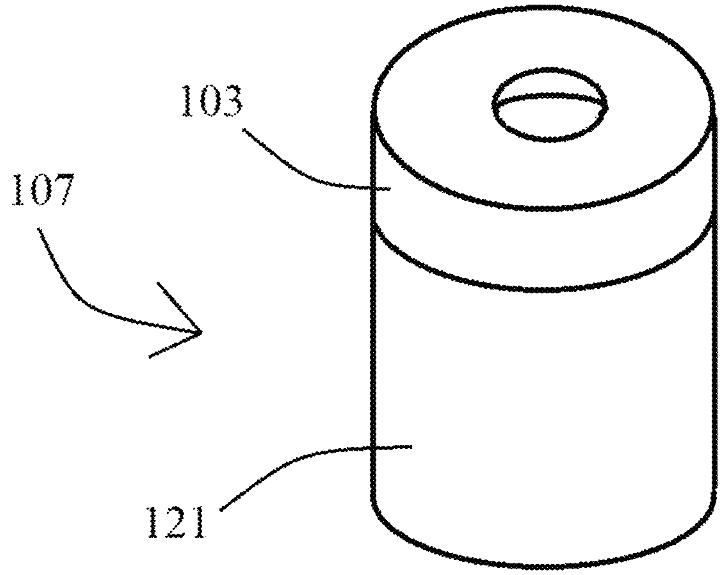
FIG. 6 shows a perspective view of the bottle holding portion of the present invention.

The first end 118 of the flexible component 104 is affixed to the first side 112 of the shoulder support component 102. The second end 120 of the flexible component 104 includes a bottle holding portion 107 (shown in FIG. 6). The bottle holding portion supports a bottle 106 for feeding an infant 110 (or a young baby) in a vertical position. Such position for the infant 110 (or the young baby) is important to reduce ear infections and reflux. In an embodiment, the first end 118 of the flexible component 104 may be affixed to the shoulder support component at a position 119 that is behind the neck or at a position that is in the middle of the upper back of the caregiver when worn by the caregiver 108.

It should be understood that the flexible component 104 should be of sufficient strength so that when the weight of a bottle is attached to it, the flexible component 104 retains its shape. The flexible component, however, should be sufficiently flexible so that it can be bent without too much effort into a position so that it provides the baby or infant with the ideal feeding angle. The length of the flexible component should be of a length that makes it the ideal length for the feeding of the baby/infant. It should be of a length that makes it relatively facile to insert the bottle holding portion onto the flexible component and positioned into the baby/infant's mouth. The flexible component should not be too long so that it is unwieldy to operate.

In an embodiment, the baby can be held in a vertical position by use of a baby carrier that is designed to fit over the shoulders of the caregiver. In this embodiment, the caregiver has two free hands as the baby is being supported by a baby carrier and the bottle is being supported by the apparatus of the present invention. Because both the baby carrier and the apparatus of the present invention are attached to the shoulders of the caregiver, the caregiver can walk or has mobility that is more limited in the absence of the apparatus of the present invention and the baby carrier. In an embodiment, the baby carrier can be worn so that the baby carrier is first placed on the caregiver and the device of the present invention is placed over the baby carrier. The baby carrier may position the baby so that the baby's back is abutting the front of the caregiver (i.e., both the caregiver and the baby are facing in the same direction). Alternatively, the baby may be in a position where the baby's front is facing the caregiver. In an alternate embodiment, the baby may be in a position that where the baby is turned 90 degrees relative to caregiver (i.e., the baby's side is adjacent to and abutting the front of the caregiver).

In some examples, the bottle holding portion may comprise one or more of an attachment mechanism (e.g., a clamp mechanism), a receiving portion or recession, and/or a fixation means to support the bottle 106 for the infant 110 during feeding. In one embodiment, the bottle is affixed by magnetism. In examples utilizing the receiving portion or recession, the bottle holding portion may comprise a resilient foam material such that walls of the receiving portion or recession holding the bottle 106 can move to allow for an insertion and a removal of the bottle 106 while still holding the bottle 106 firmly in place during feeding.

In examples utilizing the fixation means, the fixation means may include: Velcro 8 (Velcro Industries N.V., Britain) (known generically as hook and loop), snaps, fasteners, an adhesive, and/or magnets, among others not explicitly listed herein. In an embodiment, if magnetism is used, the bottle may have a magnet positioned on the bottom of the bottle that is designed to be affixed by magnetism to the bottle holding portion. It should be appreciated that when the fixation means are used to retain a position of the bottle 106, a corresponding fixation means is present on the bottle 106. For example, if magnets 103 are used by the bottle holding portion to support the bottle 106 for the infant 110 during feeding, magnets of opposite attractive polarity are also included on the bottle 106 allowing for the bottle 106 to be appropriately attached to the bottle holding portion. The bottle holding portion may comprise other parts like a silicon holding portion 121 that is designed to accommodate a bottle. The silicon holding portion 121, in an embodiment, is made of a silicon containing material. Alternatively, the silicon holding portion 121 may be made of a polymeric compound such as those made by Nalgene® (Nalge Nunc International, Thermo Fisher Scientific, Waltham, Massachusetts) such as copolymers of dimethyl terephthalate, 1,4-cyclohexanedimethanol, and 2,2,4,4-tetramethyl-1,3-cyclobutanediol or any other polymeric materials that are sufficiently strong as to support a bottle. The opening of the silicon holding portion of the bottle should be of a size that is designed to accommodate a bottle but not so large that the bottle can easily fall out of the silicon holding portion. If magnets 103 are used as shown for example in FIG. 6, to retain a bottle that has a correspondingly positioned magnet (or metal that will allow a magnet to attach to it) at the bottom of the bottle, the bottle should remain in the bottle holding portion without being able to easily fall out. The magnets 103 should be of sufficient strength so as to allow attachment of the bottle but also allow the bottle to be removed without applying too great a force (e.g., an adult should be able unaided to pull the bottle out of the bottle holding portion but the magnet should be sufficiently strong so that a baby cannot pull the bottle out. The bottle holding portion should be positioned on the apparatus 100 so that it allows for the infant 110 to be fed in the optimal vertical position when engaging with the bottle 106.

Figure 7:
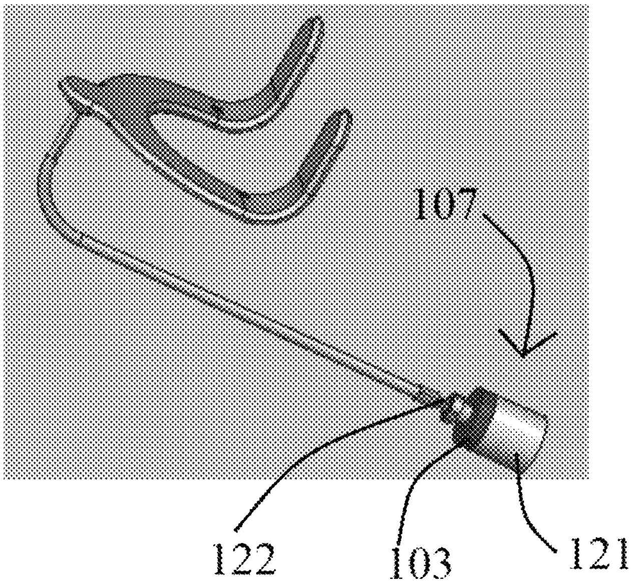
FIG. 7 shows a perspective view of the shoulder support component, the flexible component, and the bottle holding portion of the apparatus of the present invention.

FIG. 7 shows the shoulder support component, the flexible component, and the bottle holding portion 107. In an embodiment, bottle holding portion has a recess, such as a socket for a ball portion on the second end of the flexible component to make a ball-socket interaction 122 to hold the bottle holding portion thereon (see FIG. 7). As indicated, the flexible component should be sufficiently rigid so as to support a full bottle and the bottle holding portion without bending, but sufficiently flexible so that the flexible component can be bent without too much effort by the caregiver that is adjusting the bottle so that it can be placed into the baby's/infant's mouth.

In an embodiment, the bottle holding portion may also comprise an adjustable ball joint that allows the bottle to be adjusted so that it can be appropriately adjusted for the comfort of the baby. The adjustable ball joint allows the tilt of the bottle to be adjusted so that the bottle can be positioned in the infant or baby's mouth at an angle that does not cause hardship to the baby or infant's feeding. In an embodiment, the adjustable ball joint can be adjusted by applying a pressure to the bottle angle and the bottle angle will remain fixed at that position until sufficient pressure is put on the bottle to change the angle of the bottle. The adjustable ball joint is similar to the hip joint (or a shoulder joint) in a human body that allows the angle of a leg (or arm) to be adjusted relative to the pelvis (or clavicle). That is, the angle of the bottle can be adjusted relative to the principal axis of the flexible component 104 at the second end 120, wherein said second end is attached to the bottle holding portion 107 (see FIG. 7).

In an embodiment, the present invention relates to an apparatus for feeding an infant in a vertical position, the apparatus comprising:

a shoulder support component comprising a first side disposed opposite a second side, the second side being configured to contact shoulders of a caregiver; and a flexible component comprising a first end disposed opposite a second end, the first end being affixed to the first side of the shoulder support component and the second end comprising a bottle holding portion that supports a bottle for feeding an infant in a vertical position. In a variation, the shoulder support component comprises a U-shape, the U-shape designed to fit on the shoulders of the caregiver with the U-shape designed to go around the back side of a caregiver's neck. In a variation, the shoulder support component comprises a material selected from the group consisting of: a plastic material, a foam material, and a cloth material. In a variation, the shoulder support component may comprise a metallic skeleton that is covered by a plastic material, a foam material, a cloth material, or combinations thereof.

In an embodiment, the second side of the shoulder support component comprises one or more portions of padding. In a variation, the padding comprises a material that increases the comfort level of the caregiver. In an embodiment, the flexible component 104 comprises a bendable material that retains its shape. In a variation, the bottle holding portion comprises an attachment mechanism to support the bottle. In a variation, the attachment mechanism may be a clamp, hook and loop, magnets, or another attachment mechanism. In a variation, the bottle holding portion comprises a receiving portion or recession to support the bottle. In a variation, the receiving portion or recession is of a size that is slightly larger than the diameter and circumference of the bottle so that the bottle fits into the receiving portion or recession which is designed to accommodate the bottle. In a variation, the bottle holding portion comprises a fixation means to support the bottle. In a variation, the fixation means is selected from the group consisting of: hook and loop, snaps, fasteners, an adhesive, and magnets. In a variation, the bottle comprises the comparable fixation elements so that the bottle can be affixed to the receiving portion or recession of the bottle holding portion. For example, if the bottle holding portion comprises a magnet, the bottle will comprise a magnet of the opposite polarity so that it can be affixed to the bottle holing portion. If the bottle holding portion comprises the hooks from a hook and loop connection means, the bottle will comprise the corresponding loops to be affixed to the bottle holding portion.

In an embodiment, the apparatus further comprises a bib that fastens to the shoulder support component. In a variation, the bib attaches to the shoulder support component at a position that is on top of and adjacent to the shoulders of the caregiver by means of a snap fastener. In a variation, the bib may attach by other snap fit means.

In a variation, the apparatus may further comprise a baby carrier, wherein said baby carrier and said apparatus are worn by the caregiver together and at the same time. In a variation, the baby carrier is a baby carrier that is designed to fit over the shoulders of the caregiver. In an embodiment, the baby carrier may have an element of the baby carrier that fits over the shoulders and an element that is designed to go around the torso of the caregiver.

In an embodiment, the apparatus may comprise padding, In a variation, the padding may be comprised of a compound selected from the group consisting of polyester, polyether, polystyrene, polyurethane, polyethylene, vinyl, ethylene vinyl acetate copolymer foam, and combinations thereof.

In an embodiment, the apparatus may comprise bendable material that is a part of the flexible component, that is a combination of wires that are positioned in a parallel manner. In an embodiment, the parallel wires may be positioned in a helical manner. In a variation, the fixation means is by magnetism or hook and loop.

In an embodiment, the present invention relates to a method of feeding a baby in a vertical position using the apparatus of the present invention. In a variation, the method of feeding a baby in an upright vertical position comprises holding said baby in a vertical position, and the baby is fed by an apparatus for feeding an infant in a vertical position, the apparatus comprising:

a shoulder support component comprising a first side disposed opposite a second side, the second side being configured to contact shoulders of a caregiver; and a flexible component comprising a first end disposed opposite a second end, the first end being affixed to the first side of the shoulder support component and the second end comprising a bottle holding portion that supports a bottle for feeding an infant in a vertical position.

In a variation of the method, the apparatus further comprises a bib. In a variation, the baby is held in a vertical position by use of a baby carrier. In a variation, when the baby is held in a vertical position by use of the baby carrier, the caregiver's hands are freed up, thereby facilitating the caregiver's ability to be mobile while feeding the baby. In a variation of the method, the apparatus further comprises padding, the padding positioned so as to increase comfort of the caregiver. In a variation of the method, the flexible component is made of a bendable material that is designed to retain its shape when bent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Any feature that is disclosed herein can be combined with any other feature even if those features are not mentioned together, as long as those features are not incompatible. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An apparatus for feeding an infant in a vertical position, the apparatus comprising:

a shoulder support component comprising a first side disposed opposite a second side, the second side being configured to contact shoulders of a caregiver; and a flexible component comprising a first end disposed opposite a second end, the first end being affixed to a rear of the shoulder support component and the second end comprising a flexible recess configured to receive a bottle for feeding an infant in a vertical position.

2. The apparatus of claim 1, wherein the shoulder support component comprises a U-shape, and wherein the flexible component is coupled to an apex of the U-shape.

3. The apparatus of claim 1, wherein the shoulder support component comprises a material selected from the group consisting of: a plastic material, a foam material, and a cloth material.

4. The apparatus of claim 1, wherein the second side of the shoulder support component comprises one or more portions of padding.

5. The apparatus of claim 1, wherein the flexible component comprises a bendable material that retains its shape.

6. The apparatus of claim 1, wherein the flexible recess comprises an attachment mechanism to support the bottle.

7. The apparatus of claim 1, wherein the flexible recess comprises a receiving portion or recession to support the bottle.

8. The apparatus of claim 1, wherein the flexible recess comprises a fixation means to support the bottle.

9. The apparatus of claim 8, wherein the fixation means is selected from the group consisting of: hook and loop, snaps, fasteners, an adhesive, and magnets.

10. The apparatus of claim 1, further comprising a bib that fastens to the shoulder support component.

11. The apparatus of claim 10, wherein the bib attaches to the shoulder support component by means of one or more snap fasteners.

12. The apparatus of claim 4, wherein the padding is comprised of a compound selected from the group consisting of polyester, polyether, polystyrene, polyurethane, polyethylene, vinyl, ethylene vinyl acetate copolymer foam, and combinations thereof.

13. The apparatus of claim 5, wherein the bendable material is a combination of wires that are positioned in a parallel manner.

14. The apparatus of claim 8, wherein the fixation means is by magnetism or hook and loop.

* * * * *